Patented July 11, 1939

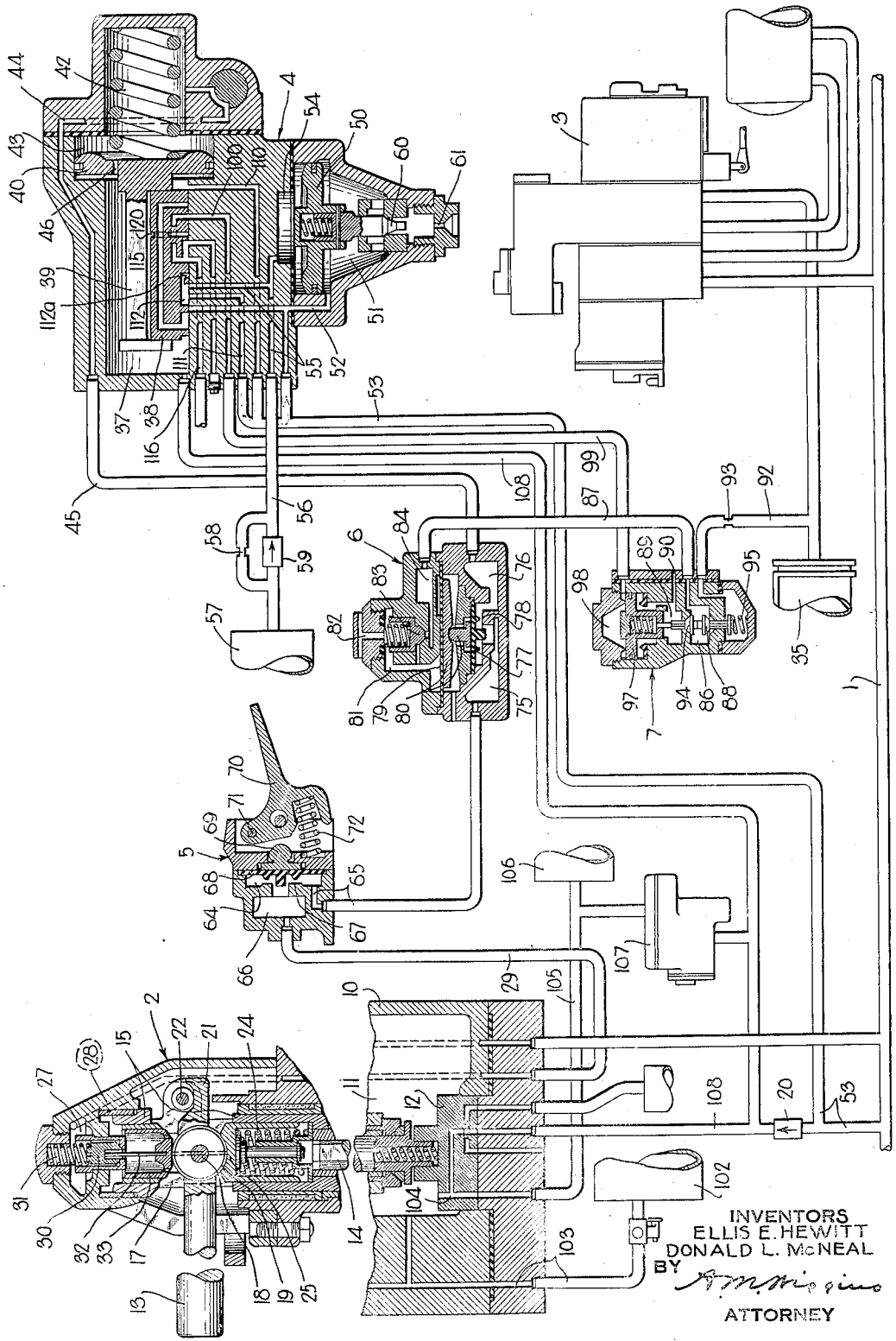

2,166,007

UNITED STATES PATENT OFFICE 2,166,007

SAFETY CONTROL EQUIPMENT

Ellis E. Hewitt, Edgewood, and Donald L. McNeal, Wilkinsburg, Pa., assignors to The Westinghouse Air Brake Company, Wilmerding, Pa., a corporation of Pennsylvania Application October 29, 1938, Serial No. 237,692

5 Claims. (Cl. 303—19)

This invention relates to fluid pressure brakes, and more particularly to an improved automatic fluid pressure brake equipment having safety control features.

It has been proposed to equip railway vehicles in certain classes of service with fluid pressure brake apparatus of the safety control type, in which is included a triple valve device of suitable design operative in accordance with a reduction in fluid pressure in a brake pipe to effect an application of the brakes, and automatic safety control or "deadman" mechanism designed to function only in the event of incapacitation of the operator to vent fluid under pressure from the brake pipe at an emergency rate to cause an emergency brake application. Occasionally, however, the operator of a passenger train so equipped may by mistake cause a "deadman" emergency application when an emergency stop is entirely unnecessary and not intended, with the result that the train and its passengers are subjected to undesired shocks, which are particularly severe if the train is proceeding slowly when the emergency brake application occurs.

The principal object of our invention is to provide an improved fluid pressure brake equipment including safety control means automatically operative, if the operator releases both a foot pedal and the handle of the usual brake valve, to vent fluid under pressure from the brake pipe at a slow rate for effecting a "deadman" service application of the brakes, and with which is associated a cut-off valve device operable upon an increase in brake cylinder pressure during a normal or manual application of the brakes to suppress operation of the safety control means, and valve means operative to prevent operation of the cut-off valve device in case a "deadman" application is initiated, thereby avoiding premature release of the brakes following a "deadman" application.

Other objects and advantages of the invention will appear in the following more detailed description thereof, taken in connection with the accompanying drawing, wherein the single figure is a diagrammatic view, mainly in section, of a fluid pressure brake equipment embodying the invention.

As shown in the drawing, the fluid pressure brake equipment, which is adapted to be mounted on a locomotive, includes a brake pipe 1, a brake valve device 2, a triple valve or brake controlling valve device 3, an application valve device 4, a foot valve device 5, a cut-off valve device 6 and a suppression selector valve device 7.

The brake valve device 2 is illustrated in fragmentary form and may be of a type similar to that shown and described in the U. S. Patent No. 2,106,483 issued to E. E. Hewitt on January 25, 1938. The brake valve device comprises a casing structure 10 having a rotary valve chamber 11 formed therein and containing a rotary slide valve 12, which is adapted to be operated by means of a handle 13 that is connected to the slide valve through the medium of a shaft 14 and rotatable sleeve member 15 secured thereto. The handle 13 extends through a slot 17 formed in the sleeve member 15 and is pivotally connected thereto by means of a pin 18 carrying a roller 19. Formed on the inner end of the handle 13 is an extension 21 adapted for rocking engagement with a retaining member 22 that is carried by the rotatable sleeve member 15.

The handle 13 is adapted to be tilted upwardly under the force of a coil spring 24, which acts through the medium of a cylindrical member 25 slidably mounted within the sleeve member 15 and acting against the roller 19, the extension 21 of the handle being fulcrumed on the retaining member 22. Formed in the upper portion of the casing of the brake valve device is a valve chamber 27 which communicates by way of a passage 28 with a pipe 29, and which has mounted therein a vent valve 30 that is normally biased toward seated position by a spring 31. The vent valve 30 is adapted to be raised to unseated position through the medium of a stem 32 and hollow plunger 33 by upward movement of the roller 19 when the handle 13 is released by the operator as hereinafter explained.

The brake controlling valve device 3 may be of any suitable type operative upon a reduction in the pressure of fluid in the brake pipe 1 to supply fluid under pressure to a brake cylinder 35 for effecting an application of the brakes, and upon an increase in brake pipe pressure to connect the brake cylinder to atmosphere for effecting the release of the brakes. Since the operation of the brake controlling valve device is well understood, the device 3 is illustrated in the drawing in outline form only.

According to the invention, the application valve device 4 comprises a casing having formed therein a slide valve chamber 37 containing a slide valve 38, which is operative through the medium of a stem 39 by a piston 40. The piston 40 is subject on one side to the pressure of fluid in the valve chamber 37 and on the other side to the force of a coil spring 42 which is disposed in a chamber 43 connected through a passage 44 with a pipe 45. A feed port 46 is formed in the piston 40 for providing restricted communication between the chambers 37 and 43. The slide valve 38 is adapted to control operation of an equalizing discharge valve mechanism comprising an equalising piston 50 mounted in a suitable bore in the casing 4 and subject on one side to the pressure of fluid in a valve chamber 51 communicating by way of passage 52 and a pipe 53 with the brake pipe 1, and on the opposite side to the pressure of fluid in a chamber 54 that is connected through a passage 55 and a pipe 56 with an equalizing reservoir 57. Interposed in the pipe 56 is a check valve 59 having associated therewith a restricted by-pass 58 by means of which initial charging of the equalizing reservoir 57 may be somewhat retarded. The equalizing piston 50 is adapted to operate upon a reduction in fluid pressure in the chamber 54 to unseat a discharge valve 60 for venting fluid under pressure from the chamber 51 and consequently from the brake pipe to the atmosphere.

The foot valve device 5 comprises a casing having a valve chamber 64 communicating with a passage and pipe 65, and a chamber 66 which is connected to the pipe 29 leading to the valve chamber 27 of the brake valve device 2. Communication between the valve chamber 64 and chamber 66 of the foot valve device is controlled by a normally unseated diaphragm valve 68 which is adapted to engage a seat 67.

Associated with the diaphragm valve 68 is a follower member 69 which is operatively aligned with a foot pedal 70 that is pivotally connected to the casing of the device by means of a pin 71. A coil spring 72 is interposed between the foot pedal 70 and the casing of the foot valve device 5 for normally maintaining the foot pedal out of engagement with the follower member 69.

The cut-off valve device 6 comprises a casing having formed therein a chamber 75 connected to the pipe 65 and a chamber 76 communicating with the pipe 45, communication between which chambers is controlled by a diaphragm valve 77 that is adapted for engagement with a seat 78. For moving the diaphragm valve 77 into seated position there is provided a diaphragm 79 which is operatively connected with a diaphragm valve through the medium of abutting follower members 80, and which diaphragm is subject to the pressure of fluid in a chamber 81 normally communicating with the atmosphere by way of a passage 82. A normally seated pilot valve 83 is operatively mounted in the casing for controlling supply of fluid under pressure to the chamber 81 from a chamber 84 during a certain stage of operation of the equipment as hereinafter explained.

The suppression selector valve device 7 is adapted to control a supply of fluid at the pressure of that supplied to the brake cylinder 35 for actuating the cut-off valve device 6, and comprises a casing having a valve chamber 86, which communicates through a pipe 87 with the chamber 84 of the cut-off valve device 6, and which contains a supply valve 88 and a release valve 94. The supply valve 88 controls the admission to the valve chamber of fluid at the pressure of that supplied to the brake cylinder 35 by way of a branch pipe 92 having a restricted portion 93, and the release valve 94 is cooperable with the supply valve and controls communication from the valve chamber 86 to the atmosphere by way of a chamber 89 and passage 90. The valves 88 and 94 are normally held in unseated and seated positions, respectively, under the force of a spring 95, and are adapted to be shifted to their opposite positions upon downward movement of a piston 97 under the pressure of fluid supplied to a piston chamber 98 communicating through a pipe 99 with a passage 100 leading to the seat of the slide valve 38 of the application valve device 4.

*Running condition*

Assuming that the brake valve device 2 is held in the running position as shown in the drawing, fluid under pressure for charging the equipment is supplied from the usual main reservoir 102 through a pipe and passage 103 to the rotary valve chamber 11 within the brake valve device, and thence flows through a passage 104 in the rotary valve 12 and a pipe 105 to an equalizing reservoir 106, which is associated with an equalizing discharge mechanism 107. It will be understood that the equalizing discharge mechanism 107, which is illustrated in outline form in the drawing, is of the well known type operative to vent fluid under pressure from the brake pipe in accordance with reduction in the pressure of fluid in the equalizing reservoir 106 as effected by the usual operation of the brake valve device 2 for causing a desired application of the brakes.

Fluid under pressure is also supplied by way of passage 104 in the rotary valve 12 through a pipe 108 to the valve chamber 37 of the application valve device 4 and thence flows through the restricted passage 46 in the piston 40 to the chamber 43. With the pressure of fluid on opposite sides of the piston 40 substantially equalized the spring 42 is effective to maintain the piston and slide valve 38 in the normal position as shown in the drawing, in which position of the slide valve a port 110 in the seat thereof is maintained open to the chamber 37 so that fluid under pressure is supplied therethrough to the pipe 53 and thence to the brake pipe 1. As the brake pipe 1 is thus charged with fluid under pressure, the brake controlling valve device 3 is operated in the usual manner to effect charging of the auxiliary reservoir while connecting the brake cylinder 35 to the atmosphere by way of communications not shown in the drawing.

Fluid under pressure thus supplied to the pipe 53 also flows therefrom through the passage 52 in the application valve device 4 to the discharge valve chamber 51, and by way of a passage 111 and a cavity 112 formed in the slide valve 38 to the passage 55 communicating with the equalizing piston chamber 54 and the equalizing reservoir 57.

At the same time, when the slide valve 38 of the application valve device in the normal position as shown in the drawing, it will be noted that the passage 100, which communicates by way of pipe 99 with the piston chamber 98 of the suppression selector valve device 7, is connected to the atmosphere through a passage 115 and an atmospheric exhaust passage 116. Since the piston 97 is thus subjected only to atmospheric pressure on both sides thereof, the spring 95 is effective to maintain the valve 88 in unseated position while holding the valve 94 in seated position as shown in the drawing.

Referring again to the application valve device 4, it will be observed that the normally charged piston chamber 43 is adapted to be vented to atmosphere, as hereinafter more fully explained, through a safety control communication controlled by each of three valves, namely, the diaphragm valve 77 of the cut-off valve device 6, the diaphragm valve 68 of the foot valve device 5, and the vent valve 30 mounted in the brake valve device 2. The unseating of all three of these valves at the same time will effect venting of fluid under pressure from the piston chamber 43 of the application valve device by way of the communications already described. On the other hand, as long as any one of the three valves remains in seated position, the venting of fluid from the chamber 43 is prevented. It will be understood that the volume included in the safety control communication just referred to is quite small in comparison to the volume of the piston chamber 43, so that any one of the above valves may be operated to unseated position simultaneously with or just after the closing of either of the associated valves without materially affecting the pressure of fluid in the piston chamber 43. In the drawing, the handle 13 of the brake valve device 2 is represented as disposed in its horizontal position, in which the handle must be held by the operator against the force of the spring 24 in order to permit the spring 31 to maintain the vent valve 30 in seated position for closing communication from the valve chamber 27 to the atmosphere.

Normal service application

If the operator desires to effect an application of the brakes in the usual manner, he may operate the brake valve device 2 to an application position, with the handle 13 thereof maintained in a horizontal plane to prevent unseating of the valve 30 as already explained. Assuming that the rotary valve 12 is moved to service position, fluid under pressure is vented from the equalizing reservoir 106 by way of the pipe 105 and suitable atmospheric communications established by the rotary valve, and the equalizing discharge valve device 107 is accordingly operated in the well known manner to vent fluid under pressure from the pipe 108, and consequently from the brake pipe 1 which communicates with that pipe by way of the pipe 53 and a branch communication including a check valve 20 preventing back flow of fluid from the pipe 108 to the pipe 53. Upon the reduction in the pressure of fluid in the brake pipe 1 as thus effected, the brake controlling valve device 3 is automatically operated to supply fluid under pressure from the usual auxiliary reservoir to the brake cylinder 35 for effecting the application of the brakes.

Fluid at the pressure of that supplied to brake cylinder 35 is also supplied by way of the pipe 92 and past the unseated valve 88 of the suppression selector valve device 7 to the valve chamber 86, and thence flows by way of pipe 87 to the chamber 84 of the cut-off valve device 6. Upon a predetermined increase in the brake cylinder pressure acting in the chamber 84 against the lower face of the valve 83, the valve is moved to its upper seated position for cutting off the atmospheric communication 82 while establishing communication from the chamber 84 to the diaphragm chamber 81, whereupon the diaphragm 79 is moved downwardly by fluid pressure and acts through the medium of the follower members 80 to force the diaphragm valve 77 against the seat 78. Since the seated diaphragm valve 77 of the cut-off valve device is independently effective to prevent discharge of fluid under pressure from the chamber 43 of the application valve device 4 as hereinbefore explained, it will be apparent the operator may at this time, if he desires, allow the handle 13 of the brake valve device 2 to assume its upwardly canted position under the force of the spring 24 for unseating the vent valve 30, without causing undesired operation of the piston 40 of the application valve device 4.

Meanwhile, as fluid under pressure is being vented from the brake pipe 1 by operation of the equalizing discharge valve device 107 as already explained, fluid under pressure will of course be discharged at the same rate from the slide valve chamber 37 of the application valve device 4 by flow through the pipe 108 and the discharge valve device 107, while fluid under pressure is similarly vented from the pipe 53 communicating with the brake pipe. Since the pipe 53 is at this time in communication with both the equalizing piston chamber 54 and the discharge valve chamber 51, the fluid pressures acting on opposite sides of the equalizing piston 50 of the application valve device 4 are reduced simultaneously, so that any possibility of undesired operation of the discharge valve 60 and consequent interference with the reduction in brake pipe pressure as determined by the positioning of the brake valve device 2 is avoided.

The release of the brakes may be effected in the usual manner by movement of the brake valve device 2 to the running position for causing the supply of fluid under pressure to the brake pipe 1, whereupon the brake controlling valve device 3 is again operated to establish communication from the brake cylinder 35 to the atmosphere. It will be understood that, with the brake apparatus again charged with fluid under pressure as already explained, the operator must continue to hold the brake valve handle 13 in its horizontal position as shown in the drawing, or in the alternative must maintain the foot pedal 70 in its lowermost position for holding the diaphragm valve 68 in seated position, in order to permit the locomotive to proceed with the brakes released.

Safety control service application

According to the invention, the safety control equipment is adapted for automatic operation to effect a service application of the brakes if the operator should release both the foot valve pedal and the handle of the brake valve device, without having first brought the vehicle or train to a stop by an application of the brakes effected in the usual manner through the medium of the brake valve. Assuming that the various valve devices of the equipment shown in the drawing are in release position as illustrated, if the operator withdraws his hand from the handle 13 of the brake valve device 2, the spring 24 becomes effective through the medium of the member 25 and roller 19 to tilt the handle upwardly about the fulcrum member 22, thus causing the plunger member 33 and stem 32 to unseat the vent valve 30.

When the vent valve 30 of the brake valve device 2 is thus unseated, fluid under pressure is discharged from the piston chamber 43 of the application valve device 4 to atmosphere by way of the passage 44, pipe 45, chamber 76 of the cut off valve device 6, past the unseated diaphragm valve 77 thereof and through the chamber 75, pipe 65, connected chambers 64 and 66 of the foot valve device 5, pipe 29, passage 28 of the brake valve device, valve chamber 27, and past the vent valve 30. Upon the resultant reduction of the pressure of fluid in the piston chamber 43, the fluid pressure in the valve chamber 37 is rendered effective to move the piston 40 against the pressure of the spring 42 to shift the slide valve 38 into application position.

Upon movement of the application slide valve 38 to application position, a restricted portion 112a of the cavity 112 in the slide valve is brought into registration with the passage 116, whereupon fluid under pressure is vented at a service rate from the equalizing reservoir 57 and piston chamber 54 to the atmosphere, thereby causing the fluid pressure in the discharge valve chamber 51 to move the piston 50 upwardly so that the valve 60 is operated to establish communication from the chamber 51 to the atmosphere by way of the passage 61. Fluid under pressure is then vented from the brake pipe 1 at a service rate by way of the pipe 53, passage 52 of the application valve device, and past the unseated discharge valve 60. The consequent reduction in brake pipe pressure at a service rate causes operation of the brake controlling valve device 3 to effect a service application of the brakes. The check valve 20 of course prevents flow of fluid under pressure from the pipe 108 to the pipe 53 and brake pipe 1.

At the same time, with the application slide valve 38 in application position, a port 120 formed therein establishes communication from the valve chamber 37 to the passage 100, which communicates through the pipe 99 with the chamber 98 of the suppression selector valve device 7. Fluid under pressure thereby supplied to the chamber 98 actuates the piston 97 to unseat the release valve 94 and to move the supply valve 88 to seated position against the pressure of spring 95. With the supply valve 88 in seated position, fluid under pressure supplied by the usual operation of the brake controlling valve device 3 to the brake cylinder 35 and the connected pipe 92 is prevented from flowing to the valve chamber 86 of the suppression selector valve device, which valve chamber is at the same time open by way of the unseated release valve 94 and chamber 89 and passage 90 to the atmosphere.

It will thus be seen that, although fluid under pressure has been supplied to the brake cylinder 35 for effecting a service application of the brakes, in response to automatic operation of the safety control mechanism, the cut-off valve device 6 is nevertheless prevented from closing the atmospheric communication from the piston chamber 43 of the application valve device to atmosphere, so that fluid pressure cannot be built up in the piston chamber by flow through the restricted port 46 of the piston 40 so long as the brake equipment remains unattended by the operator.

In order to effect the release of the brakes following a safety control service application as just explained, the operator must either operate the foot pedal 70 to close the diaphragm valve 68 of the foot valve device 5, or move the handle 13 of the brake valve device 2 downwardly to its horizontal position as shown in the drawing, thereby permitting movement of the vent valve 30 to seated position. With either of the above mentioned valves moved to seated position, and with the brake valve device 2 disposed in running position, fluid under pressure supplied in the manner hereinbefore explained to the valve chamber 37 of the application valve device 4 flows by way of the restricted port 46 in the piston 40 to the piston chamber 43, thus increasing the fluid pressure therein until the spring 42 is unabled to return the piston 40 and the associated slide valve 38 to the normal position illustrated. Upon movement to the application slide valve 88 to normal position, fluid under pressure is again supplied to the brake pipe through communications hereinbefore described, and the brake controlling valve device 3 responds to the consequent increase in brake pipe pressure for effecting the release of the brakes. At the same time, the chamber 98 of the suppression selector valve device 7 is once more connected to the atmosphere by way of communications established in the application valve device 4, so that the spring 95 is permitted to shift the valves 88 and 94 to the normal position as shown in the drawing.

It will be understood from the foregoing description that, according to our invention, there is provided a fluid pressure brake equipment embodying safety control means automatically operative, if the required attention of the operator is withdrawn, to effect a relatively gentle service application of the brakes, as distinguished from an emergency application, together with means operable to effect suppression of operation of the safety control means when desired but only after the brakes are first applied by means of the usual brake valve.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake of the class involving a normally charged brake pipe, a brake controlling valve device operative in accordance with a predetermined reduction in brake pipe pressure to effect an application of the brakes to any desired degree and an engineer's brake valve device manually operable to control discharge of fluid from the brake pipe, in combination, an equalizing discharge valve device operative upon a reduction in pressure of fluid in an equalizing reservoir to vent fluid under pressure from the brake pipe, a normally charged safety control pipe, an application valve device operative upon the venting of fluid from said safety control pipe to vent fluid under pressure from said equalizing reservoir at a service rate, and safety control means adapted to vent fluid under pressure of said safety control pipe to initiate operation of the said application valve device unless held in an inoperative position by the operator.

2. A safety control brake equipment comprising a brake pipe, a brake controlling valve device operative upon a reduction in brake pipe pressure to effect an application of the brakes, equalizing discharge valve means responsive to manual control for venting fluid under pressure from the brake pipe at any desired rate, a normally charged safety control pipe, an application valve device including an equalizing discharge valve means automatically operative, in response to venting of fluid under pressure from said safety control pipe, to vent fluid from the brake pipe at a limited or service rate, safety valve means automatically operative when released by the operator to vent fluid under pressure from said safety control pipe, and cut-off valve means responsive to a service application of the brakes, as effected by said manually controlled equalizing discharge valve means, for preventing operation of said application valve device regardless of operation of said safety valve means.

3. A safety control brake equipment comprising a brake pipe, a brake controlling valve device operative upon a reduction in brake pipe pressure to effect an application of the brakes, brake valve means manually operable for venting fluid under pressure from the brake pipe at any desired rate, a normally charged safety control pipe, an application valve device including an equalizing discharge valve means automatically operative, in response to venting of fluid under pressure from said safety control pipe, to vent fluid under pressure from the brake pipe at a limited or service rate, safety valve means automatically operative when released by the operator to vent fluid under pressure from said safety control pipe, cut-off valve means responsive to a service application of the brakes, as effected by operation of said brake valve device, for preventing operation of said application valve device regardless of operation of said safety valve means, and means operative to prevent response of said cut-off valve means to a safety control service application of the brakes.

4. Safety control apparatus for a fluid pressure brake equipment of the type embodying a normally charged brake pipe, a brake valve device for venting fluid under pressure therefrom, and means responsive to reduction in brake pipe pressure to effect an application of the brakes, said safety control apparatus comprising a normally charged safety control pipe, safety valve means automatically operative if released by the operator to vent said safety control pipe, a cut-off valve device operable by fluid under pressure to prevent discharge of fluid from said safety control pipe, suppression selector valve means operable by fluid under pressure for controlling a normally open communication through which fluid under pressure may be supplied to said cut-off valve device during an application of the brakes, and an application valve device automatically operative upon the venting of fluid from said safety control pipe to effect a reduction in the pressure of fluid in the brake pipe at a service rate while supplying fluid under pressure to said suppression selector valve means to prevent subsequent closing of the safety control pipe.

5. Safety control apparatus for a fluid pressure brake equipment of the type embodying a normally charged brake pipe, a brake valve device for venting fluid under pressure therefrom, and means responsive to reduction in brake pipe pressure to effect an application of the brakes, said safety control apparatus comprising a normally charged safety control pipe, safety valve means automatically operative if released by the operator to vent said safety control pipe, a cut-off valve device operable by fluid under pressure to prevent discharge of fluid from said safety control pipe, suppression selector valve means operable by fluid under pressure for controlling a normally open communication through which fluid under pressure may be supplied to said cut-off valve device during an application of the brakes, and an application valve device including equalizing discharge valve means operative according to reduction in fluid pressure in an equalizing chamber to vent fluid under pressure from the brake pipe and valve means operative in response to venting of fluid from said safety control pipe for discharging fluid under pressure from said equalizing chamber at a service application rate while effecting supply of fluid under pressure to said suppression selector valve means.

ELLIS E. HEWITT.
DONALD L. McNEAL.